United States Patent Office.

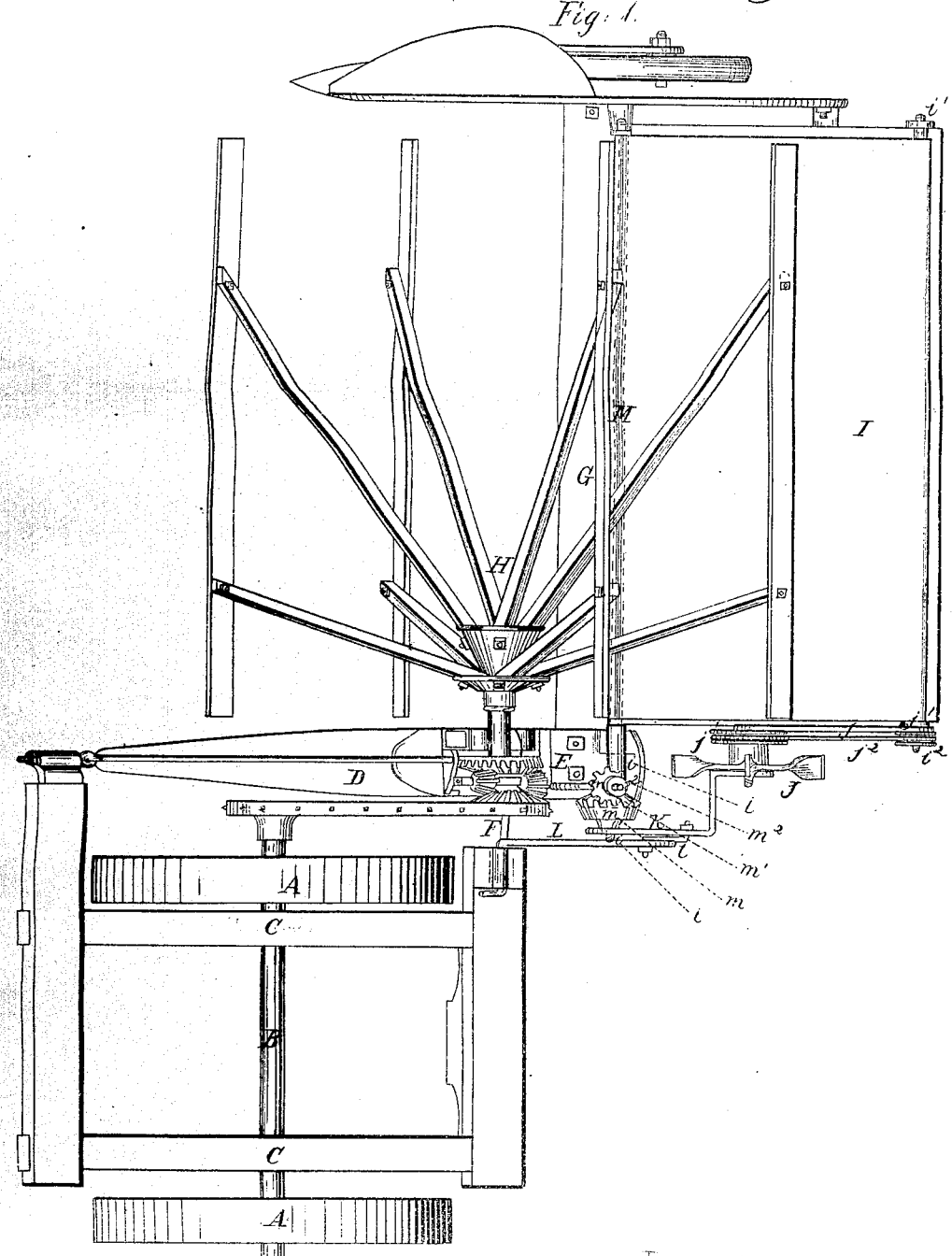

AMOS RANK, OF SALEM, OHIO.

Letters Patent No. 81,208, dated August 18, 1868.

IMPROVEMENT IN HARVESTER-RAKES.

The Schedule referred to in these Letters Patent and making part of the same.

TO ALL WHOM IT MAY CONCERN:

Be it known that I, AMOS RANK, of Salem, in the county of Columbiana, and State of Ohio, have invented certain new and useful Improvements in Harvesters, of which the following is a full, clear, and exact description.

The invention herein claimed, consists—

First, in a novel method of combining, with an endless apron arranged to discharge the cut grain behind the cutting-apparatus, a wheel on an arm vibratable vertically parallel with the line of motion of the apron, by which wheel the apron is moved.

Second, in a novel method of combining, in a harvester, an endless-discharging apron, a wheel to move the apron on the end of a vibratable arm, and a device operated by the driver to raise and lower the propelling-wheel, whereby an intermittent movement is imparted to the endless apron, to regulate the size of the gavels.

Third, in a novel method of combining, in a harvester, an endless apron to discharge the cut grain, with a rod-cut-off vibrating horizontally over the apron in a circular path.

Fourth, in a novel method of combining, in a harvester, an endless-discharging apron, a vertically-vibratable propelling-wheel to move the apron, and a cut-off vibrating over the platform, with a device operated by the driver, which simultaneously starts the discharging-apron, and interposes the cut-off.

Fifth, in a novel method of combining, in a harvester, a reel to sweep the grain back upon the cutting-apparatus, an intermittently-moving discharging-apron, a vertically-vibratable propelling-wheel, a cut-off, and a device operated by the driver, for stopping the discharge and interposing the cut-off.

In the accompanying drawings, which make part of this specification, I have shown all my improvements embodied in one machine.

Figure 1 represents a plan or top view of so much of a harvester embracing my improvements as is necessary to illustrate my invention, Figure 2 a view of the same, partly in elevation and partly in section, at the line $x\ x$ of fig. 1, and Figure 3 a view in elevation of the drag-bar and supporting-shoe.

In this instance, two driving and supporting-wheels A A' turn on an axle, B, mounted in proper bearings on a main frame, C. The driving-wheels are to be provided with suitable backing-ratchets. The machine is drawn by a tongue in the usual way, and provided with suitable gearing, cutting-apparatus, and other necessary parts of a fully-organized harvester.

A drag-bar, D, carries a shoe, E, to which a finger-beam, G, is attached. A coupling-arm, F, also connects the shoe with the main frame. The parts are so constructed as to allow the cutting-apparatus to conform freely to the undulations of the ground, which construction is so well known as to require no explanation here.

The grain-end of the finger-beam is provided with a divider and supporting-wheel of the usual construction. The heel-end of the finger-beam is supported by a chain or link, $f$, from the main frame.

A reel, H, is by preference mounted on a post secured to the shoe, and driven by gearing, as shown in the drawing, or in the usual way.

An endless apron, I, runs on shafts $i\ i^1$, the latter one of which carries a pulley, $i^2$, on its stubble-end. A wheel, J, by preference made star-shaped or with spokes only, as shown in the drawings, is mounted in this instance on an arm, $j$, pivoted to play freely vertically on the shaft $i^1$. A pulley, $j^1$, on the walking-wheel, is encircled by a band or cord, $j^2$, from the pulley $i^2$. By this means the endless apron is put in motion whenever the walking-wheel touches the ground.

An arm, K, vibrating on a fulcrum, in this instance the shaft $i$, has a slot, $k$, on its outer end, in which the projecting axis of the walking-wheel enters. A compound rocking-lever, L, on the main frame, vibrates this arm K and the wheel J, by means of a link, $l$, by which means the driver can start or stop the endless apron at pleasure. The range of this vibratory motion can be varied by adjusting the link $l$ in holes in the lever and arm, or in other well-known ways.

The arm $k$ also carries a sector-rack, $m$, gearing into a pinion, $m^1$, on a turning-post, $m^2$, carrying a cut- Rasar & Mayes,
Gate Latch.
N° 81,209. Patented Aug. 18, 1868.
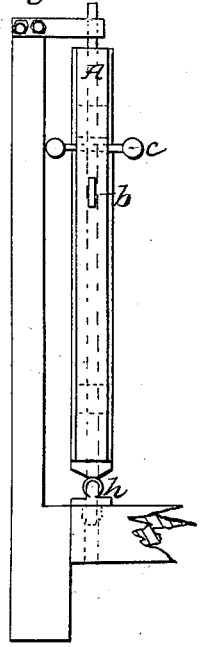
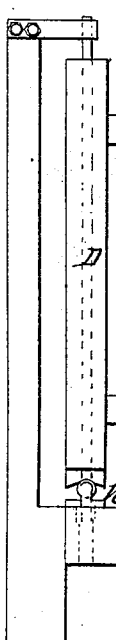
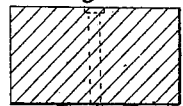
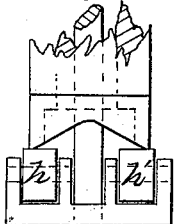
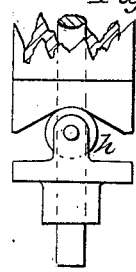
Witnesses:
Inventors:
Peter Rasor
D. J. Mayes
pr Boyd & Co
Atty